(12) United States Patent
Wu (10) Patent No.: US 12,025,867 B2
(45) Date of Patent: Jul. 2, 2024

(54) DISPLAY DEVICE AND ANTI-PEEP STATE SWITCHING FILM DRIVING METHOD THEREOF

(71) Applicant: TCL CHINA STAR OPTOELECTRONICS TECHNOLOGY CO., LTD., Guangdong (CN)

(72) Inventor: Wanchun Wu, Guangdong (CN)

(73) Assignee: TCL CHINA STAR OPTOELECTRONICS TECHNOLOGY CO., LTD., Guangdong (CN)

( * ) Notice: Subject to any disclaimer, the term of this patent is extended or adjusted under 35 U.S.C. 154(b) by 0 days.

(21) Appl. No.: 17/441,904

(22) PCT Filed: Aug. 13, 2021

(86) PCT No.: PCT/CN2021/112406
§ 371 (c)(1),
(2) Date: Sep. 22, 2021

(87) PCT Pub. No.: WO2023/010610
PCT Pub. Date: Feb. 9, 2023

(65) Prior Publication Data
US 2024/0027799 A1    Jan. 25, 2024

(30) Foreign Application Priority Data

Aug. 6, 2021   (CN) .......................... 202110900413.5

(51) Int. Cl.
*G02F 1/13*       (2006.01)
*G02F 1/133*      (2006.01)
(Continued)

(52) U.S. Cl.
CPC ........ *G02F 1/1323* (2013.01); *G02F 1/13306* (2013.01); *G02F 1/136286* (2013.01); *G02F 1/1368* (2013.01)

(58) Field of Classification Search
CPC ............... G02F 1/1323; G02F 1/13306; G02F 1/136286; G02F 1/1368
(Continued)

(56) References Cited

U.S. PATENT DOCUMENTS

2005/0206814 A1   9/2005  Histake
2018/0210243 A1   7/2018  Fang et al.
(Continued)

FOREIGN PATENT DOCUMENTS

CN    104732168 A    6/2015
CN    204790254 U   11/2015
(Continued)

OTHER PUBLICATIONS

Chinese Office Action issued in corresponding Chinese Patent Application No. 202110900413.5 dated Mar. 17, 2022, pp. 1-11.
(Continued)

*Primary Examiner* — Alexander P Gross
*Assistant Examiner* — William D Peterson (57) ABSTRACT

The present invention provides a display device and an anti-peep state switching film driving method thereof. The display device has an anti-peep display function, and an anti-peep state switching film is also disposed on the display device. Selectively electrifying the anti-peep state switching film can change a display viewing angle of the display device. Specifically, a time control cooperatively supplies each of the release electrodes with a driving signal individually to achieve switching between an anti-peep state and a sharing state at will such that application scenarios of the anti-peep display become more extensive.

18 Claims, 5 Drawing Sheets

(51) Int. Cl.
*G02F 1/1362* (2006.01)
*G02F 1/1368* (2006.01)

(58) Field of Classification Search
USPC .......................................................... 349/56
See application file for complete search history.

(56) References Cited

U.S. PATENT DOCUMENTS

2019/0294001 A1   9/2019  Li et al.
2020/0310172 A1*  10/2020  Li ........................... G06F 21/84

FOREIGN PATENT DOCUMENTS

| CN | 105353539 A | 2/2016 | |
| CN | 105702171 A | 6/2016 | |
| CN | 105717705 A | 6/2016 | |
| CN | 106054423 A | 10/2016 | |
| CN | 106154644 A | 11/2016 | |
| CN | 205720964 U | 11/2016 | |
| CN | 106647048 A | 5/2017 | |
| CN | 106707652 A | 5/2017 | |
| CN | 106773179 A | 5/2017 | |
| CN | 108363250 A | 8/2018 | |
| CN | 108646493 A | 10/2018 | |
| CN | 111208666 A * | 5/2020 | ......... G02F 1/13342 |
| CN | 111796438 A | 10/2020 | |
| CN | 212255969 U | 12/2020 | |
| JP | H08136909 A | 5/1996 | |
| JP | 2001264768 A | 9/2001 | |
| JP | 2002357804 A | 12/2002 | |
| JP | 2005316470 A | 11/2005 | |
| TW | 574573 B | 2/2004 | |

OTHER PUBLICATIONS

Chinese Office Action issued in corresponding Chinese Patent Application No. 202110900413.5 dated Aug. 25, 2022, pp. 1-6.
International Search Report in International application No. PCT/CN2021/112406, mailed on Apr. 29, 2022.
Written Opinion of the International Search Authority in International application No. PCT/CN2021/112406, mailed on Apr. 29, 2022.
Japanese Office Action issued in corresponding Japanese Patent Application No. 特願2021-566268 dated Sep. 19, 2023, pp. 1-5.

* cited by examiner

DISPLAY DEVICE AND ANTI-PEEP STATE SWITCHING FILM DRIVING METHOD THEREOF

FIELD OF INVENTION

The present application relates to a field of display technologies, especially to a display device with an anti-peep function and an anti-peep state switching film driving method thereof.

BACKGROUND OF INVENTION

With the development of network technologies, more and more people perform operations such as shopping or account transactions on the internet. Especially for demands of banks and government security agencies, during the above operations, operators often need to input personal information to display devices of computers, mobile phones, ATMs, and automatic ticket dispensers, which can easily cause leakage of personal information. Therefore, an anti-peep capability of a display device is getting more and more attention.

With anti-peep technologies of liquid crystal displays (LCDs) gradually maturing, more and more anti-peep products emerge. Namely, by adding an advance light control film (ALCF) in a backlight to control a light exiting viewing angle of the backlight, an anti-peep display is visible within a certain small viewing angle, and displayed imaged cannot be viewed in a large viewing angle, which performs an anti-peep effect.

Conventional anti-peep displays bring users excellent privacy. The anti-peep displays are intensively used in personal information display devices in public places but an anti-peep function cannot be switched to a sharing state, which makes use scenarios and use functions limited and a market value thereof is difficult the exert. For example, display devices used for meeting rooms can switch to an anti-peep state according to use scenarios. When a confidential meeting is proceeded, the display device can switch on the anti-peep state to reduce a viewing angle. When training a grouped of people is needed, a larger display viewing angle is required to meet the needs of viewers in different locations to clearly view the display contents.

As described above, the conventional anti-peep display device function are relatively simple functions and cannot switch the anti-peep state. It is required to provide a display device that can switch a display effect of a anti-peep state or a sharing state according to use scenarios to fill a market gap.

SUMMARY OF INVENTION

Technical Issue

The present application embodiment provides a display device and an anti-peep state switching film driving method thereof to solve a technical issue that a conventional anti-peep display device only has an anti-peep state and cannot select the anti-peep state or a sharing state according to application scenarios.

Technical Solution

To solve the above technical issue, the present invention provides a display device capable of switching an anti-peep state, comprising:
a liquid crystal display panel;
an anti-peep film located on a light incident side of the liquid crystal display panel and configured to achieve anti-peep display; and,
an anti-peep state switching film located on a light exiting side of the liquid crystal display panel and configured to achieve switching between display effects of an anti-peep state and a sharing state;
wherein the anti-peep state switching film comprises:
a first substrate and a second substrate disposed oppositely, a liquid crystal layer located between the first substrate and the second substrate, and driver electrodes located on at least one side of the liquid crystal layer, wherein the driver electrodes are configured to drive liquid crystals of the liquid crystal layer to rotate to adjust a light exiting angle of display light;
when the liquid crystal display panel is in the anti-peep state, the driver electrodes of the anti-peep state switching film drive the liquid crystals in a region corresponding to each of electrodes to rotate relative to the first and second substrates by the same angle to reduce the light exiting angle of display light; or, after the liquid crystal display panel switches to the sharing state, the driver electrodes drive the liquid crystals in a region corresponding each of electrodes to rotate relative to the first and second substrates by different angles to diffuse the light exiting angle of display light.

According to a preferred embodiment of the present invention, the anti-peep state switching film comprises a middle region and anti-peep regions located on a central region along a horizontal display direction, a vertical display direction, and a diagonal display direction, and an area of the anti-peep regions is greater than an area of the central region.

According to a preferred embodiment of the present invention, the driver electrodes are distributed on the central region and the anti-peep regions located on a periphery of the central region, a difference of driving voltages of each of the driver electrodes corresponding to the central region and the anti-peep regions respectively is different from that of another of the driver electrodes, and rotational angles of the liquid crystals in the central region and the anti-peep regions respectively are different.

According to a preferred embodiment of the present invention, when the liquid crystal display panel is in the anti-peep state, the difference of the driving voltages located in the central region is the same as the difference of the driving voltages located in the anti-peep regions on the periphery of the central region;
when the liquid crystal display panel is in the sharing state, the driver electrodes in regions corresponding to the different electrodes drive the liquid crystals to rotate by different differences of the driving voltages, and the rotational angle of the liquid crystals of the anti-peep regions is greater than the rotational angle of the liquid crystals of the central region.

According to a preferred embodiment of the present invention, the driver electrodes comprise a common electrode located on the first substrate or the second substrate, and release electrodes relatively located on the other of the first substrate and the second substrate, wherein the common electrode is disposed as an entire surface, the release electrodes are arranged in an array, and adjacent ones of the release electrodes are insulative to each other to individually receive a time signal, the common electrode and the release electrodes are electrified to constitute a vertical electrical field.

According to a preferred embodiment of the present invention, the release electrodes comprise strip electrodes arranged in an array along a horizontal display direction of the liquid crystal display panel, adjacent ones of the strip electrodes are disposed at an interval, and the strip electrodes are correspondingly distributed on a middle display region and a display region relatively located on two sides of the middle display region.

According to a preferred embodiment of the present invention, the release electrodes is annularly and radially disposed, the release electrodes comprise a central electrode pattern, and annular electrode patterns extending outward from the central electrode pattern, the central electrode pattern is correspondingly located in a central display region of the liquid crystal display panel, and the annular electrode patterns correspondingly covers the display region outside the central display region.

According to a preferred embodiment of the present invention, the central electrode and the annular electrodes are hollow and circular electrodes, and inner diameters of the annular electrodes gradually increase from a center of the anti-peep state switching film to an edge, and shapes of the annular electrodes extending outward gradually fit an edge outline of the anti-peep state switching film.

According to a preferred embodiment of the present invention, on a side of the anti-peep state switching film disposed with the release electrodes, a driver integrated circuit (IC), a time control circuit connected to the driver IC, and a driving line connected to the time control circuit are disposed, the driving line comprises a gate electrode line disposed along a first direction and a data line disposed along second direction, and the release electrodes are electrically connected the gate electrode line and the data line through thin film transistors.

According to a preferred embodiment of the present invention, the display device further comprises a scan line, a data line insulatively intersecting the scan line, and a thin film transistor connected to the scan line and the data line, a gate electrode of the thin film transistor is connected to the scan line, a source electrode is connected to the data line, a drain electrode is connected to release electrodes, the release electrodes and the common electrode form a difference of voltages constitute a liquid crystal capacitor and a storage capacitor.

According to a preferred embodiment of the present invention, the anti-peep state switching film comprises a middle region and anti-peep regions located on two sides of the middle region, and a distribution sequence of the anti-peep region, the middle region, and the anti-peep region is along a horizontal display direction of the liquid crystal display panel; and
an area of the anti-peep regions is greater than an area of the middle region, and areas of the anti-peep regions on the two sides of the middle region are the same.

According to a preferred embodiment of the present invention, the driver electrodes comprise a common electrode located on the first substrate or the second substrate and release electrodes located on the same one of the first substrate and the second substrate with the common electrode, wherein the common electrode is disposed in a comb shape, the release electrodes are disposed insulatively to one another and arranged in an array to individually receive a time signal, the release electrodes are correspondingly disposed in gaps of the common electrode, and the common electrode and the release electrodes are electrified to constitute a horizontal electrical field.

According to a preferred embodiment of the present invention, the release electrodes comprise strip electrodes arranged in an array along the horizontal display direction of the liquid crystal display panel, the common electrode comprises a comb electrode and a common line connected to the comb electrode, and the strip electrodes are embedded in a tooth electrode formed by the comb electrode and the common line.

According to a preferred embodiment of the present invention, a driving voltage of the strip electrodes corresponding to the middle region and a driving voltage of the corresponding to the anti-peep regions are different, the comb electrode receives a constant voltage, and the comb electrode and adjacent one of the strip electrodes form a horizontal electrical field to drive the liquid crystals to rotate.

According to a preferred embodiment of the present invention, a backlight module is further disposed on the light incident side of the liquid crystal display panel, and the backlight module comprises:
  a light guide plate;
  a light source located on a light incident side of the light guide plate;
  a diffuser plate located on a light exiting side of the light guide plate;
  a prism film located on a light exiting side of the diffuser plate; and,
  the anti-peep film located on a light exiting side of the prism film.

According to a preferred embodiment of the present invention, the anti-peep film is a microscopic shutter, and an interval of the microscopic shutter is 0.07 mm.

According to a preferred embodiment of the present invention, the liquid crystal layer is one of vertically rotational type liquid crystals, twisted nematic type liquid crystals, or horizontally rotational type liquid crystals.

According to the display device provided by the present invention, also provides an anti-peep state switching film driving method for a display device, an anti-peep state switching film comprises: a first substrate and a second substrate disposed oppositely, a liquid crystal layer located between the first substrate and the second substrate, and driver electrodes located on at least one side of the liquid crystal layer, the driver electrodes comprise a common electrode and release electrodes disposed opposite to the common electrode, the release electrodes are distributed insulatively, and an electrical field is generated between the electrified release electrodes and the common electrode to drive the liquid crystals to rotate;
  wherein the driving method comprises:
  when the display device is in a sharing display mode, applying a current of a constant voltage to the common electrode of the anti-peep state switching film; and
  applying a voltage different from that on the common electrode to the release electrodes of the anti-peep state switching film to constitute an electrical field driving the liquid crystals to rotate, and voltages applied to adjacent ones of the release electrodes on the first substrate and the second substrate are different to diffuse rotational angles of the liquid crystals.

According to a preferred embodiment of the present invention, the method further comprises:
  in the release electrodes distributed on the first substrate or the second substrate, voltages applied to the release electrodes are gradually lowered along a direction from ones of the release electrodes relatively near a central display region to ones of the release electrodes relatively away from the central display region; and a minimal voltage value applied to the release electrodes is greater than or equal to a voltage value applied to the common electrode.

According to a preferred embodiment of the present invention, when the display device is in an anti-peep display mode, no voltage is applied to the anti-peep state switching film, the liquid crystals of the anti-peep state switching film are at a pre-tilt rotational angle, and the liquid crystals in a region corresponding to each of the release electrodes are at the same rotational angle to reduce a light exiting range.

Advantages

Advantages of the present application embodiment are as follows: Compare to the conventional technology, the present invention provides a display device and an anti-peep state switching film driving method thereof. The display device has an anti-peep display function, and an anti-peep state switching film is also disposed on the display device. Selectively electrifying the anti-peep state switching film can change a display viewing angle of the display device. Specifically, a time control cooperatively supplys each of the release electrodes with a driving signal individually to achieve switching between an anti-peep state and a sharing state at will such that application scenarios of the anti-peep display becomes more extensive.

DETAILED DESCRIPTION OF PREFERRED EMBODIMENTS

The present application provides a display device with an anti-peep function and an anti-peep state switching film driving method thereof. To make the objective, the technical solution, and the effect of the present application clearer and more explicit, the present application will be further described in detail below with reference to the accompanying drawings. It should be understood that the specific embodiments described here are only used to explain the present application instead of being used to limit the present application.

Further descriptions of the present application in conjunction with the drawings and specific embodiments are as follows.

The present application embodiment provides a display device including an anti-peep function, and detailed descriptions in conjunction with FIGS. 1 to 4 are as follows.

Figure 1:
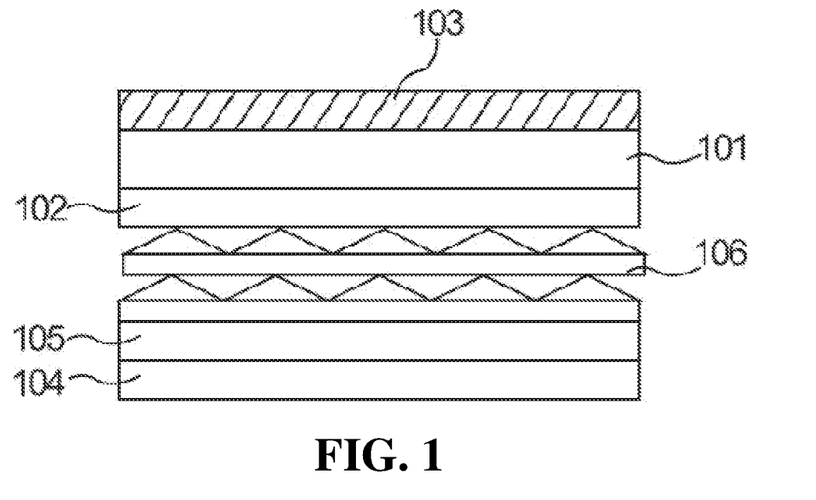
FIG. 1 is a schematic structural view of a display device provided by the present invention.

With reference to FIG. 1, FIG. 1 illustrates the display device provided by the present invention comprising a liquid crystal display panel 101, a backlight module and an anti-peep film 102 located on a light incident side of the liquid crystal display panel 101, and an anti-peep state switching film 103 located on a light exiting side of the liquid crystal display panel 101. The backlight module comprises a light guide plate 104, a light source located on a light incident side of the light guide plate 104, a diffuser plate 105 located on a light exiting side of the light guide plate 104, and a prism film 106 located on a light exiting side of the diffuser plate 105. The anti-peep film 102 is located on a light exiting side of the prism film 106.

The anti-peep film 102 is disposed between the backlight module and the liquid crystal display panel 101 and is configured to filter partial backlight entering the liquid crystal display panel 101 into a light in an specific angle. The anti-peep film 102 exists in form of a microscopic shutter. An interval of the microscopic shutter is 0.07 mm, and a fence of the microscopic shutter has a certain height and can absorb and limit passing light in the viewing angle. Generally, a right viewing angle serves as a normal, a viewing angle of light of the anti-peep film 102 can be 60±4 degrees.

The anti-peep state switching film 103 is disposed on the light exiting side of the liquid crystal display panel 101. The anti-peep state switching film 103 also serves as a light filtering layer and can adjust an angle of exiting light of the liquid crystal display panel 101, which not only achieves a sharing state of a large viewing angle, but also achieves a anti-peep state of a small viewing angle.

Figure 2A:
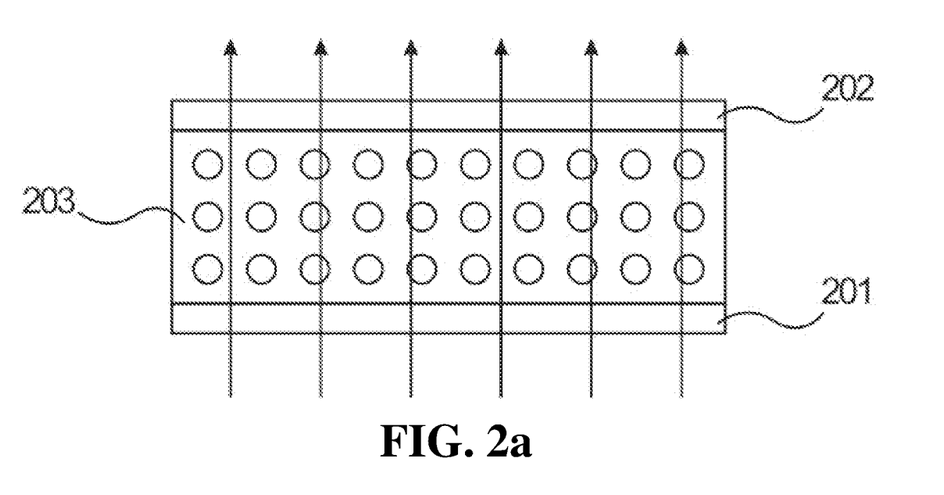
FIGS. 2a and 2b are schematic principle views of anti-peep state switching of the display device provided by the present invention.
Figure 2B:
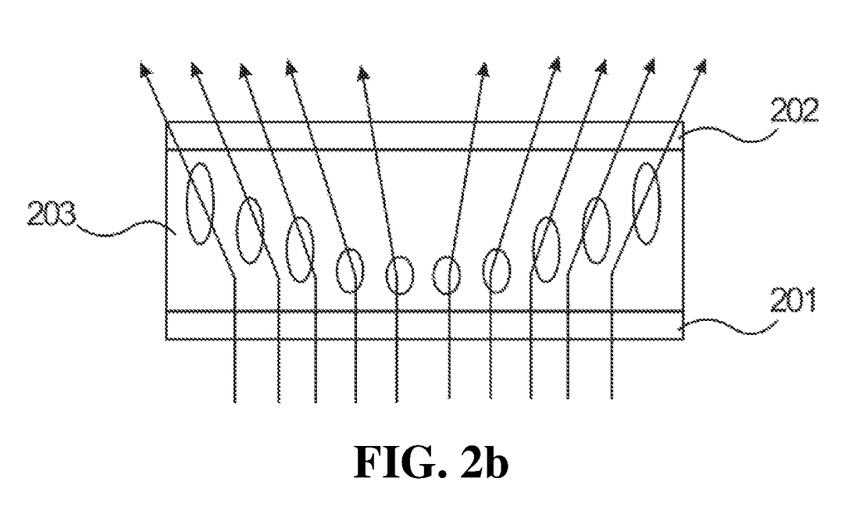

With reference to FIGS. 2a and 2b, FIGS. 2a and 2b are schematic structural views of the anti-peep state switching film, and the anti-peep state switching film comprises a first substrate 201, a second substrate 202 disposed opposite to the first substrate 201, a liquid crystal layer 203 located between the first substrate 201 and the second substrate 202, and driver electrodes located on at least one side of the liquid crystal layer 203. A driving principle of the liquid crystal layer 203 of the anti-peep state switching film is similar to a driving principle of the liquid crystal display panel, both are generating a vertical electrical field or a horizontal electrical field through the driver electrodes to drive the liquid crystals to rotate to adjust light of transmission light to further adjust a viewing angle of the liquid crystal display panel. A difference is that control of the liquid crystal layer 203 of the liquid crystal display panel is specifically in a pixel level so densities of metal wiring and driver electrode arrangement is high and precision requirement is high. Control precision of the anti-peep state switching film is specifically to display partitions, its manufacturing precision requirement is comparatively low, and a manufacturing cost thereof is low. Specifically, taking a VA type liquid crystal mode for example, FIG. 2a illustrates the anti-peep state of the anti-peep state switching film, liquid crystals molecules are neatly arranged without rotation, and light extends through the liquid crystal layer 203 and exits along a vertical direction, the viewing angle is lower. On the contrary, FIG. 2b illustrates the sharing state of the anti-peep state switching film, the liquid crystals molecules regularly rotate, light extends through the film layer and exits along a diffuse direction, and the viewing angle is increased.

Figure 2C:
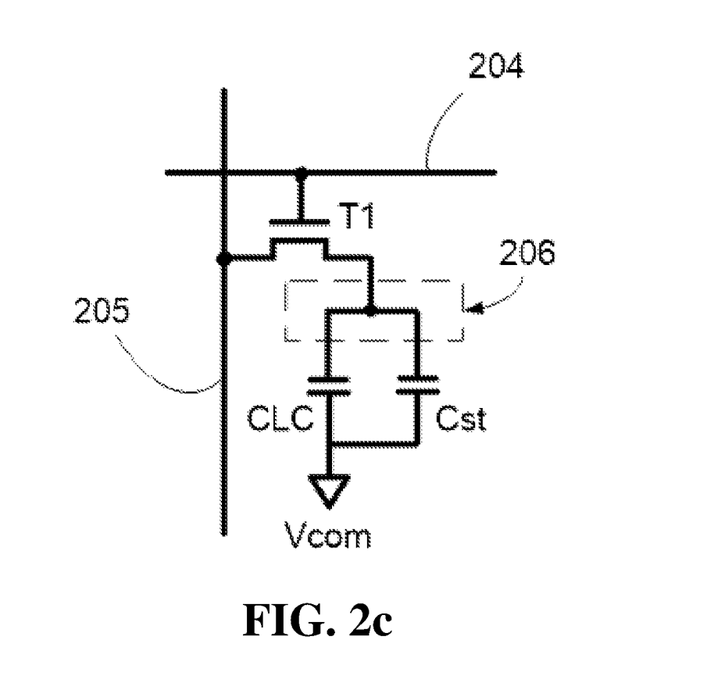
FIG. 2c is a view of a driver circuit of an anti-peep state switching film of a display device provided by the present invention.

With reference to FIG. 2c, FIG. 2c is an equivalent driver circuit diagram of the anti-peep state switching film and comprises a scan line 204, a data line 205 insulatively intersecting the scan line 204, and a thin film transistor T1 connected to the scan line 204 and the data line 205. A gate electrode of the thin film transistor T1 is connected to the scan line 204, a source electrode of the thin film transistor T1 is connected to the data line 205, and a drain electrode of the thin film transistor T1 is connected to release electrodes 206. The release electrodes 206 and a common electrode Vcom form a difference of voltages and constitute a liquid crystal capacitor CLC and a storage capacitor Cst. The common electrode Vcom is located on any side of the anti-peep state switching film.

Specifically, the liquid crystal layer 203 of the anti-peep state switching film is made of non-PN type liquid crystals, PN type liquid crystals are polymer network liquid crystals (PNLCs). PNLC liquid crystals are not spherical or ellipsoidal micro droplets, but are distributed in a three dimensional polymer net to form a continuous channel network. The PN type liquid crystals have two characteristics resulting in low contrast: 1) The PN LC has a high cell thickness (10 um/16 um), a transmittance Tr=20, the cell thickness of the PNLC is greater so the PNLC is brighter in a dark state, which affects contrast, and the contrast is a ratio of a bright state to the dark state. 2) Alignment conditions of the PNLC liquid crystals require ultra-low temperature processes and high energy irradiation, because a temperature difference between portions of the substrate, alignment effect is poor to affect a dark state effect. As above, the PN type liquid crystals would lead to low contrast of the liquid crystal display panel. The anti-peep state switching film preferably employs a vertical alignment (VA) type liquid crystal film, a twisted nematic (TN) liquid crystal film, or an in-plane switching (IPSs) type liquid crystal film to guarantee display contrast of the liquid crystal display panel.

First Embodiment

Figure 3A:
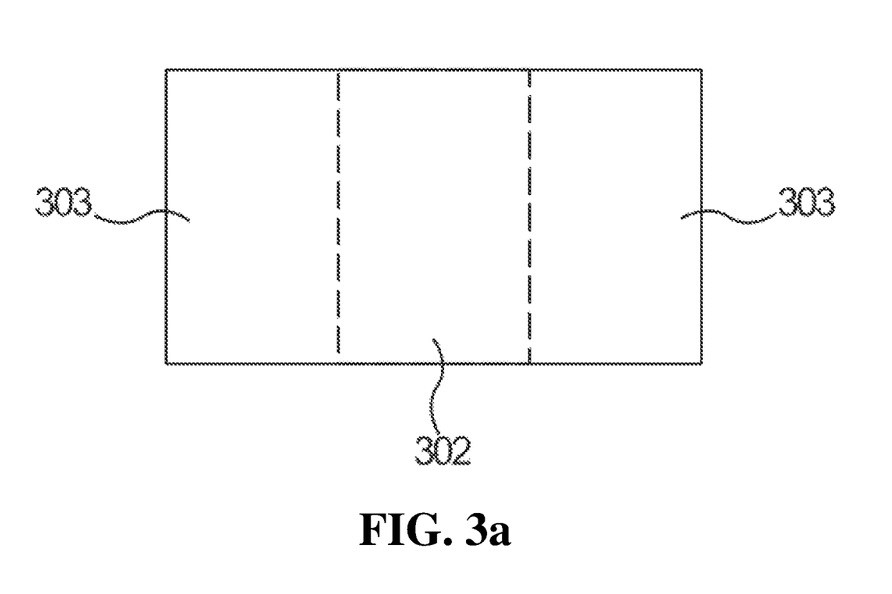
FIGS. 3a to 3d are schematic structural views of a first embodiment of the display device provided by the present invention.

With reference to FIG. 3a, the anti-peep state switching film, according to viewing angle requirements of the liquid crystal display panel, can be divided into a middle region 302 and anti-peep regions 303 located on two sides of the middle region 302. Furthermore, a distribution sequence of the anti-peep region 303, the middle region 302, and the anti-peep region 303 is along a horizontal display direction of the liquid crystal display panel. An area of the anti-peep regions 303 is greater than an area of the middle region 302, and the areas of the anti-peep regions 303 located on the two sides of the middle region 302 are the same. An area of a single one of the anti-peep regions 303 is greater than an area of the middle region 302, and the greater the area of the single anti-peep regions 303 is, the smaller the area of the middle region 302 is. the middle region 302 has a viewing angle right facing a user, an non-right facing viewing angle does not allow a peep, which as a natural anti-peep effect. However, the anti-peep regions 303 on two sides are easily peeped by the user, and an anti-peep process is required particularly. The greater the area of the anti-peep region 303 is, the wider the anti-peep viewing angle is and better the anti-peep effect is.

A function of the anti-peep state switching film is direction-adjusting display light passing through the liquid crystal display panel. In combination with actual use scenarios, the anti-peep state refers that at a vertical viewing angle or approximately vertical viewing angle to the liquid crystal display panel, a better light transmittance is needed to fulfill normal information display and acquisition. On the contrary, at the angle departing from the vertical viewing angle, light needs to be blocked to reduce a display range to achieve an anti-peep effect. According to a requirement of viewing angle characteristics by the liquid crystal display panel under the anti-peep state, the driver electrodes of the anti-peep state switching film are required to be disposed separately. Namely, the release electrodes (electrodes disposed separately from one another) are disposed in an array on substrates of any sides of the anti-peep state switching film, adjacent ones of the release electrodes are disposed insulatively, each of the release electrodes drives liquid crystals of a corresponding region to rotate, and the release electrodes distributed on the entire anti-peep state switching film receives driving signals of different values through a time control to implement distinguishing rotation controls for the liquid crystals molecules of different regions to match the display requirement of the liquid crystal display panel in different viewing angles.

Figure 3B:
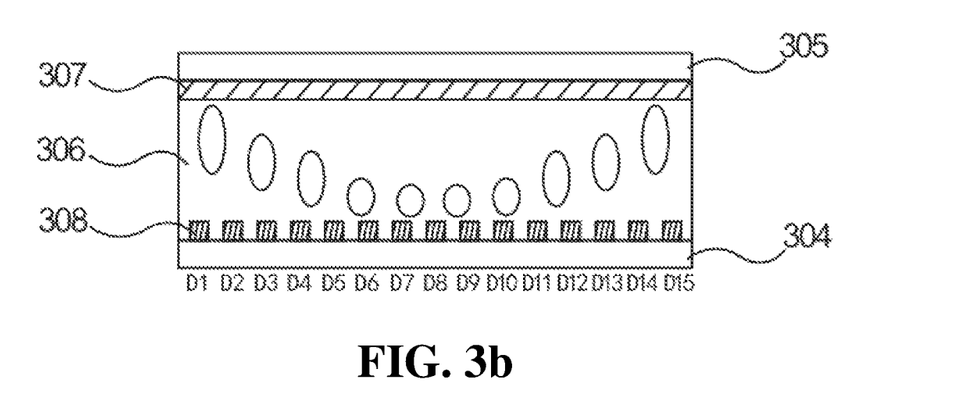

With reference to FIGS. 3a and 3b, an anti-peep state switching film provided by the present invention takes a VA type anti-peep state switching film as an example for explanation. Specifically, the anti-peep state switching film comprises a first substrate 304, a second substrate 305 disposed opposite to the first substrate 304, and a liquid crystal layer 306 disposed between the first substrate 304 and the second substrate 305. The driver electrodes are disposed on an upper side and a lower side of the liquid crystal layer 306. The driver electrodes comprise release electrodes 308 located on a side of the first substrate 304 facing the second substrate 305 and a common electrode 307 located on a side of the second substrate 305 facing the first substrate 304. The common electrode 307 and the release electrodes 308 are disposed oppositely and form a difference of voltages to drive the liquid crystals to rotate to change a display viewing angle of the liquid crystal display panel.

The release electrodes are disposed separately on the first substrate 304 and/or the second substrate 305. Specifically, the release electrodes are disposed in array corresponding to the middle region 302 and the anti-peep regions 303 located on the two sides of the middle region 302. Driving voltage differences of regions (liquid crystal rotation is driven by a voltage difference between electrodes on upper and lower sides or left and right sides of the liquid crystals, the greater a voltage difference value is, the greater a rotational angle of the liquid crystals is) corresponding to different release electrodes are different. Rotational angles of the liquid crystals of the regions corresponding to the different release electrodes are different. For example, under the anti-peep state, driving voltage differences located in the middle region 302 and the anti-peep regions 303 are the same, and the rotational direction and angle of the liquid crystals of the corresponding regions are consistent to guide light to exit vertically out from the display panel such that the viewing angle can be lowered and the liquid crystals can be arranged along the same direction during alignment of the liquid crystals to achieve the anti-peep state without electrification. Also, for example, under the sharing state, the driver electrodes of the regions corresponding to the different release electrodes drive the liquid crystals to rotate by different differences of the driving voltages, and the rotational angle of the liquid crystals of the anti-peep regions 303 is greater than the rotational angle of the liquid crystals of the middle region 302 to guide light to be diffusively emitted out to increase the viewing angle.

In the present embodiment, under the sharing state, the display viewing angle is greater along a horizontal direction, the driver electrodes can be further refined along a vertical direction to improve a vertical display viewing angle.

The driver electrodes comprise a common electrode 307 located on the first substrate 304 and release electrodes 308 located on the second substrate 305. The common electrode 307 is disposed on an entire surface, and the release electrodes 308 are distributed. Furthermore, the release electrodes 308 comprises strip electrodes D1-D15 disposed in an array along the horizontal display direction of the liquid crystal display panel, and adjacent ones of the strip electrodes are disposed parallelly at intervals. The strip electrodes are distributed in the middle region 302 and the anti-peep regions 303 on two sides of the middle region 302.

Specifically, the liquid crystal layer 306 of the anti-peep state switching film has been arranged regularly with a pre-tilt angle during alignment of the liquid crystals. A regular state is that long axes of the liquid crystals in the middle region 302 and the anti-peep regions 303 under the anti-peep state are along the same direction, the anti-peep state is maintained when no electrification is applied, and light is vertically emitted out from the display panel, which can lower the viewing angle. Under the sharing state, the common electrode 307 receives a constant voltage, the strip electrodes located in the middle region 302 and the anti-peep regions 303 a voltage different from that of the common electrode 307 to form a driving voltage difference to guide the liquid crystals to rotate according to the pre-tilt angle. In the meantime, a voltage difference between the strip electrodes located in the middle region 302 and the common electrode 307 is less than a voltage difference between the strip electrodes located in the anti-peep regions 303 and the common electrode 307 to further guide the liquid crystals in the anti-peep regions 303 to achieve large angle rotation, diffuse exiting light, and widen the display viewing angle.

Figure 3C:
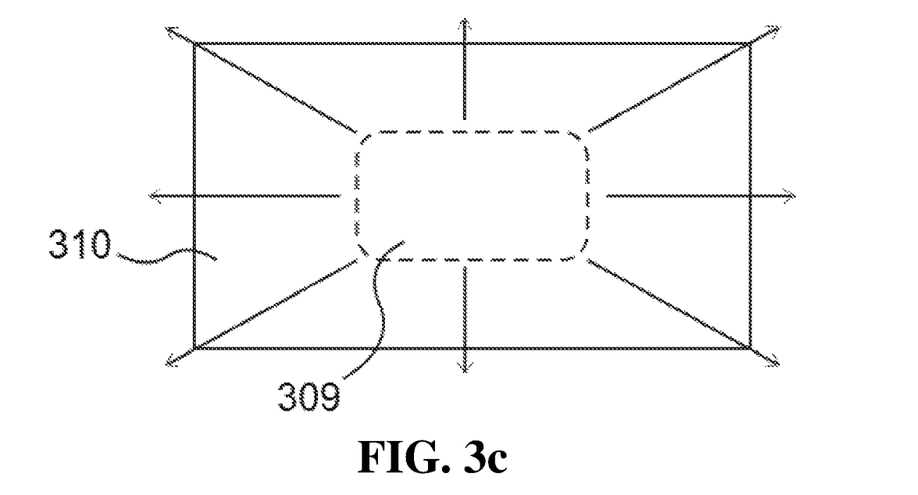

With reference to FIG. 3c, the anti-peep state switching film, according to viewing angle requirements of the liquid crystal display panel, can be divided into a central region 309 and anti-peep regions 310 along a horizontal direction, a vertical direction and a diagonal display direction of the central region 309. An area of the anti-peep region 310 is greater than an area of the central region 309. the driver electrodes are evenly distributed in the central region 309 and the anti-peep regions 310 located on a periphery of the central region 309. Specifically, driving voltage differences of the regions corresponding to the different electrodes are different, rotational angles of the liquid crystals in different regions are different. For example, under the anti-peep state, difference of driving voltages in the central region 309 and the anti-peep regions 310 located on the periphery of the central region 309 are the same, and the rotation direction and angle of the liquid crystals in the regions corresponding to the electrodes are consistent to guide light to be vertically emitted out from the display panel such that the viewing angle can be lowered. Also for example, under the sharing state, the driver electrodes in regions corresponding to the different electrodes drive the liquid crystals to rotate by different differences of the driving voltages, and the rotational angle of the liquid crystals of the anti-peep regions 310 is greater than the rotational angle of the liquid crystals of the central region 309 to guide light to be diffusively emitted out to increase the viewing angle.

Figure 3D:
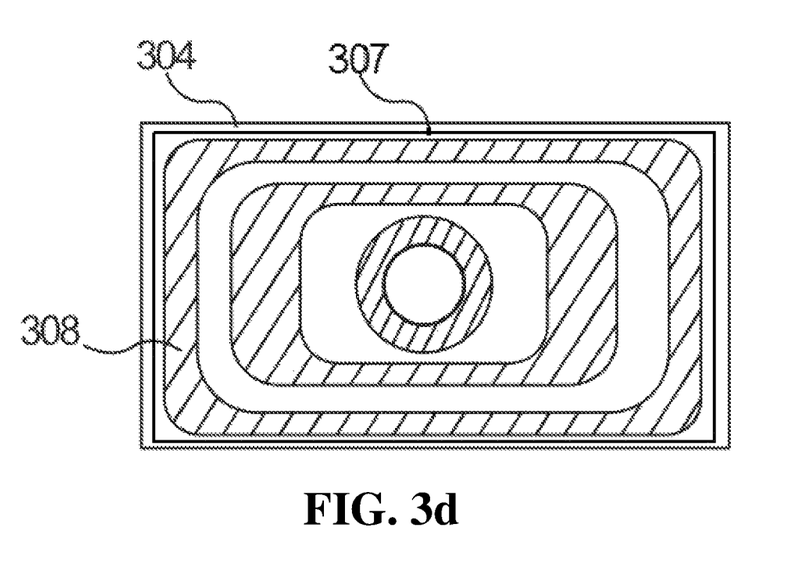

With reference to FIG. 3d, the driver electrodes comprises a common electrode 307 located on the first substrate 304 and a release electrodes 308 located on the second substrate. The common electrode 307 is disposed as an entire surface, and the release electrodes 308 is distributed. Furthermore, the release electrodes 308 is annularly and radially disposed, the release electrodes 308 comprises a central electrode and annular electrodes extending outward from the central electrode. The central electrode is correspondingly located on a central display region of the liquid crystal display panel. The annular electrodes correspondingly covers the display region outside the central display region.

The release electrodes 308 is annularly and radially disposed, for example, both the central electrode and the annular electrodes are hollow and circular electrode, and inner diameters of the annular electrodes gradually increase from a center of the anti-peep state switching film to an edge, and shapes of the annular electrodes extending outward gradually match an edge outline of the anti-peep state switching film. Compared to the strip electrodes disposed in an array along a single direction, the strip electrodes only has the anti-peep effect along a single direction, namely, an display image is anti-peep along a horizontal direction or a vertical direction. The annular electrodes evenly distribute electrodes along the horizontal and vertical directions, different electrodes are distributed annularly on the entire anti-peep state switching film, and different electrodes also receive driving signals by a time control, which can achieve anti-peep and sharing on a periphery direction of the display panel.

Specifically, with reference to FIGS. 3b to 3d, the liquid crystal layer 306 of the anti-peep state switching film has been arranged regularly with a pre-tilt angle and during alignment of the liquid crystals. A regular state is that the long axes of the liquid crystals in the central region 309 and the anti-peep regions 310 located on a periphery of the central region 309 are along the same direction under the anti-peep state, and the anti-peep state is maintained when no electrification is applied, and light is vertically emitted out from the display panel, which can lower the viewing angle. Under the sharing state, the common electrode 307 receives a constant voltage, the annular electrodes located in the central region 309 and the anti-peep regions 310 receives a voltage different from that on the common electrode 307 to form a driving voltage difference to guide the liquid crystals to rotate according to the pre-tilt angle. In the meantime, a voltage difference between the annular electrodes located in the central region 309 and the common electrode 307 is less than a voltage difference between the annular electrodes located in the anti-peep regions 310 and the common electrode 307 to further guide the liquid crystals of the anti-peep regions 310 to achieve large angle rotation, diffuse exiting light, and widen the display viewing angle.

Second Embodiment

Figure 4:
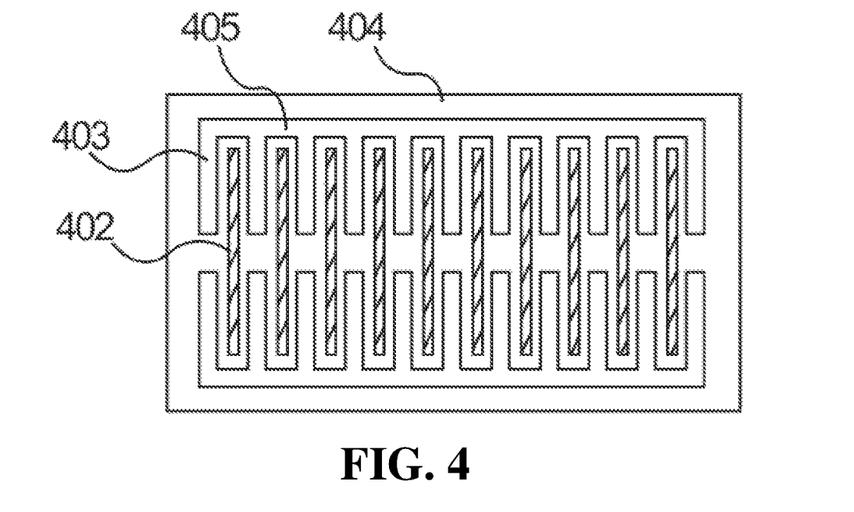
FIG. 4 is a schematic structural view of a second embodiment of the display device provided by the present invention.

With reference to FIG. 4, the anti-peep state switching film provided by the present invention takes an IPS type as an example for explanation. Specifically, the anti-peep state switching film comprises a first substrate 404, a second substrate disposed opposite to the first substrate 404, and a liquid crystal layer disposed between the first substrate 404 and the second substrate. Driver electrodes are disposed on a single side of the liquid crystal layer. The driver electrodes comprise a common electrode located on the first substrate 404, and release electrodes located on the same one of the first substrate and the second substrate with the common electrode. the common electrode and the release electrodes are-comb like and disposed alternately. The common electrode and the release electrodes constitute a horizontal electrical field to drive liquid crystals to rotate. Similarly, the common electrode and the release electrodes can also be disposed on the second substrate, a liquid crystal driving principle and disposing are the same as those on the first substrate 404.

Specifically, the common electrode and the release electrodes are located on the same one of the first and second substrate, and the release electrodes comprise strip electrodes 402 disposed horizontally in an array on the first substrate 404. The common electrode comprises a comb electrode 403, and a common line 405 connected to the comb electrode 403. The strip electrodes 402 are embedded in a tooth electrode.

Similarly, the strip electrodes 402 have different driving voltages corresponding to the middle region and the anti-peep regions. The comb electrode 403 receives a constant voltage, and form a horizontal electrical field with adjacent one of the strip electrodes 402 to drive the liquid crystals to rotate. Voltage setting and embodying principles of the specific region are the same as those in the VA mode and will not be described repeatedly here.

Combining the first embodiment and second embodiment, on the substrate of the anti-peep state switching film disposed with the driver electrodes, a driver IC, a time control circuit connected to the driver IC, and a driving line connected to the time control circuit are disposed. The driving line comprises a gate electrode line disposed along a first direction, and a data line disposed along a second direction. The release electrodes are electrically connected to the gate electrode line and the data line through the thin film transistor.

Third Embodiment

The anti-peep state switching films provided by the first embodiment and the second embodiment can achieve that the liquid crystal display panel displays under the anti-peep state or the sharing state. On such basis, the anti-peep state switching film can also display under a comprehensive state. For example, the anti-peep state switching film can predetermine a plurality of viewing angle modes to allow a user to select the modes as needed. Namely, the open anti-peep and sharing states process with regional anti-peep or sharing to the liquid crystal display panel, for example, sharing display images are only performed at a specific viewing angle, remaining display regions are in the anti-peep state. The specific viewing angle is not limited to a vertical viewing angle. Accordingly, a driving voltage of the strip electrodes of each region can be controlled individually to set angles for rotating the liquid crystals according to different requirements of viewing angles.

Fourth Embodiment

According to the display device provided by the present invention, an anti-peep state switching film driving method for a display device is further provided, the anti-peep state switching film comprises: a first substrate and a second substrate disposed oppositely, a liquid crystal layer located between the first substrate and the second substrate, and driver electrodes located on at least one side of the liquid crystal layer, the driver electrodes comprise a common electrode and release electrodes disposed opposite to the common electrode, the release electrodes are distributed insulatively, and an electrical field is generated between the electrified release electrodes and the common electrode to drive the liquid crystals to rotate; wherein the driving method comprises: when the display device is in a sharing display mode, applying a current of a constant voltage to the common electrode of the anti-peep state switching film; and applying a voltage different from that on the common electrode to the release electrodes of the anti-peep state switching film to constitute an electrical field driving the liquid crystals to rotate, and voltages applied to adjacent ones of the release electrodes on the first substrate and the second substrate are different to diffuse rotational angles of the liquid crystals.

Furthermore, in the release electrodes distributed on the first substrate or the second substrate, voltages applied to the release electrodes are gradually lowered along a direction from ones of the release electrodes relatively near a central display region to ones of the release electrodes relatively away from the central display region; and a minimal voltage value applied to the release electrodes is greater than or equal to a voltage value applied to the common electrode.

Furthermore, when the display device is in an anti-peep display mode, no voltage is applied to the anti-peep state switching film, the liquid crystals of the anti-peep state switching film are at a pre-tilt rotational angle, and the liquid crystals in a region corresponding to each of the release electrodes are at the same rotational angle to reduce a light exiting range.

Figure 5:
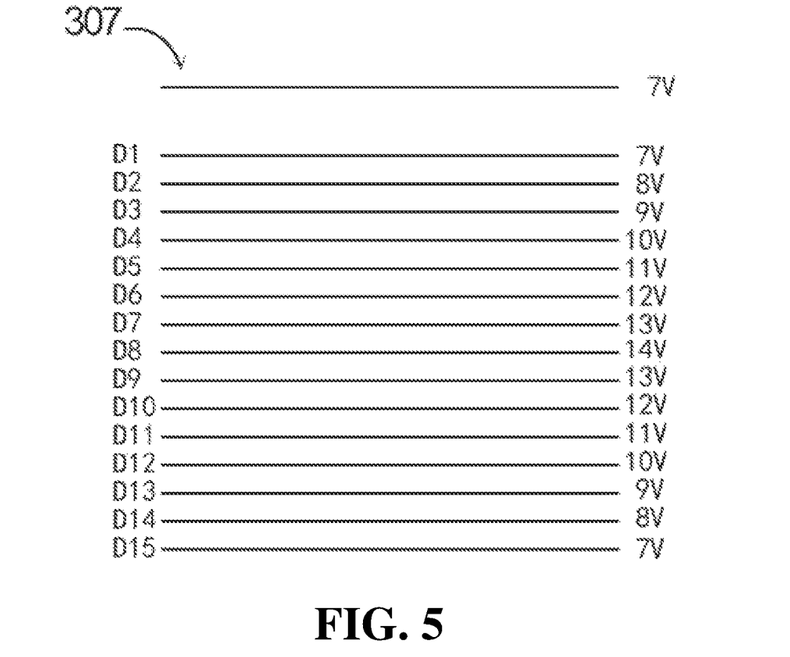
FIG. 5 is a driving principle timing diagram of switching of an anti-peep state of the display device provided by the present invention.

With reference to FIG. 5, FIG. 5 is a time control diagram of the anti-peep state switching film under the sharing state, the strip electrodes D1-D15 are disposed in an array, voltages applied to adjacent ones of the strip electrodes are different, namely voltage differences between adjacent ones of the strip electrodes and the common electrode 307 are different, and a voltage difference between the strip electrode on an edge and the common electrode 307 is less than a voltage difference between the strip electrode in a middle and the common electrode 307. The voltage differences increase gradually from the edge to the middle. Therefore, voltage difference values of regions corresponding to adjacent ones of the strip electrodes are relatively even, a difference between rotational angles of the liquid crystals in different region is small, which can reduce poor display of alternating light and dark lines.

The above solution description is for normal display of the anti-peep state switching film in the anti-peep state, and the anti-peep state switching film switches to the sharing state after electrified. Similarly, the anti-peep state switching film can also be set to have the normal display as the sharing state, and switch to the anti-peep state after electrified to have a tilt state by aligning liquid crystals of the anti-peep state switching film, namely, the sharing state. On the contrary, the electrified liquid crystals rotate to the same direction, namely, the anti-peep state. Two driving ways and setting principles are the same and will not be described repeatedly here.

Compare to the conventional technology, the display device provided by present invention has an anti-peep display function and an anti-peep state switching film is further disposed on the display device. Selectively electrifying the anti-peep state switching film changes a display viewing angle of the display device to cooperate with anti-peep backlight to achieve switching of the anti-peep state and the sharing state at will such that application scenarios of the anti-peep display are more extensively.

Although the preferred embodiments of the present invention have been disclosed as above, the aforementioned preferred embodiments are not used to limit the present invention. The person of ordinary skill in the art may make various changes and modifications without departing from the spirit and scope of the present invention. Therefore, the scope of protection of the present invention is defined by the scope of the claims.

What is claimed is:
1. A display device, comprising:
a liquid crystal display panel;

an anti-peep film located on a light incident side of the liquid crystal display panel and configured to achieve anti-peep display; and, an anti-peep state switching film located on a light exiting side of the liquid crystal display panel and configured to achieve switching between display effects of an anti-peep state and a sharing state;

wherein the anti-peep state switching film comprises:

a first substrate and a second substrate disposed oppositely, a liquid crystal layer located between the first substrate and the second substrate, and driver electrodes located on at least one side of the liquid crystal layer, wherein the driver electrodes are configured to drive liquid crystals of the liquid crystal layer to rotate to adjust a light exiting angle of display light;

when the liquid crystal display panel is in the anti-peep state, the driver electrodes of the anti-peep state switching film drive the liquid crystals in a region corresponding to each of electrodes to rotate relative to the first and second substrates by the same angle to reduce the light exiting angle of display light; or, after the liquid crystal display panel switches to the sharing state, the driver electrodes drive the liquid crystals in a region corresponding each of electrodes to rotate relative to the first and second substrates by different angles to diffuse the light exiting angle of display light;

wherein the anti-peep state switching film comprises a middle region and anti-peep regions located on a central region along a horizontal display direction, a vertical display direction, and a diagonal display direction, and an area of the anti-peep regions is greater than an area of the central region.

2. The display device according to claim 1, wherein the driver electrodes are distributed on the central region and the anti-peep regions located on a periphery of the central region, a difference of driving voltages of each of the driver electrodes corresponding to the central region and the anti-peep regions respectively is different from that of another of the driver electrodes, and rotational angles of the liquid crystals in the central region and the anti-peep regions respectively are different.

3. The display device according to claim 2, wherein when the liquid crystal display panel is in the anti-peep state, the difference of the driving voltages located in the central region is the same as the difference of the driving voltages located in the anti-peep regions on the periphery of the central region;

when the liquid crystal display panel is in the sharing state, the driver electrodes in regions corresponding to the different electrodes drive the liquid crystals to rotate by different differences of the driving voltages, and the rotational angle of the liquid crystals of the anti-peep regions is greater than the rotational angle of the liquid crystals of the central region.

4. The display device according to claim 3, wherein the driver electrodes comprise a common electrode located on the first substrate or the second substrate, and release electrodes relatively located on the other of the first substrate and the second substrate, wherein the common electrode is disposed as an entire surface, the release electrodes are arranged in an array, and adjacent ones of the release electrodes are insulative to each other to individually receive a time signal, the common electrode and the release electrodes are electrified to constitute a vertical electrical field.

5. The display device according to claim 4, wherein the release electrodes comprise strip electrodes arranged in an array along a horizontal display direction of the liquid crystal display panel, adjacent ones of the strip electrodes are disposed at an interval, and the strip electrodes are correspondingly distributed on a middle display region and a display region relatively located on two sides of the middle display region.

6. The display device according to claim 5, wherein the release electrodes is annularly and radially disposed, the release electrodes comprise a central electrode pattern, and annular electrode patterns extending outward from the central electrode pattern, the central electrode pattern is correspondingly located in a central display region of the liquid crystal display panel, and the annular electrode patterns correspondingly covers the display region outside the central display region.

7. The display device according to claim 6, wherein the central electrode and the annular electrodes are hollow and circular electrodes, and inner diameters of the annular electrodes gradually increase from a center of the anti-peep state switching film to an edge, and shapes of the annular electrodes extending outward gradually fit an edge outline of the anti-peep state switching film.

8. The display device according to claim 4, wherein on a side of the anti-peep state switching film disposed with the release electrodes, a driver integrated circuit (IC), a time control circuit connected to the driver IC, and a driving line connected to the time control circuit are disposed, the driving line comprises a gate electrode line disposed along a first direction and a data line disposed along second direction, and the release electrodes are electrically connected the gate electrode line and the data line through thin film transistors.

9. The display device according to claim 4, wherein the display device further comprises a scan line, a data line insulatively intersecting the scan line, and a thin film transistor connected to the scan line and the data line, a gate electrode of the thin film transistor is connected to the scan line, a source electrode is connected to the data line, a drain electrode is connected to release electrodes, the release electrodes and the common electrode form a difference of voltages constitute a liquid crystal capacitor and a storage capacitor.

10. A display device, comprising:

a liquid crystal display panel;

an anti-peep film located on a light incident side of the liquid crystal display panel and configured to achieve anti-peep display; and, an anti-peep state switching film located on a light exiting side of the liquid crystal display panel and configured to achieve switching between display effects of an anti-peep state and a sharing state;

wherein the anti-peep state switching film comprises:

a first substrate and a second substrate disposed oppositely, a liquid crystal layer located between the first substrate and the second substrate, and driver electrodes located on at least one side of the liquid crystal layer, wherein the driver electrodes are configured to drive liquid crystals of the liquid crystal layer to rotate to adjust a light exiting angle of display light;

when the liquid crystal display panel is in the anti-peep state, the driver electrodes of the anti-peep state switching film drive the liquid crystals in a region corresponding to each of electrodes to rotate relative to the first and second substrates by the same angle to reduce the light exiting angle of display light; or, after the liquid crystal display panel switches to the sharing state, the driver electrodes drive the liquid crystals in a region corresponding each of electrodes to rotate relative to the first and second substrates by different angles to diffuse the light exiting angle of display light;
wherein the anti-peep state switching film comprises a middle region and anti-peep regions located on two sides of the middle region, and a distribution sequence of the anti-peep region, the middle region, and the anti-peep region is along a horizontal display direction of the liquid crystal display panel; and
wherein an area of the anti-peep regions is greater than an area of the middle region, and areas of the anti-peep regions on the two sides of the middle region are the same.

11. The display device according to claim 10, wherein the driver electrodes comprise a common electrode located on the first substrate or the second substrate and release electrodes located on the same one of the first substrate and the second substrate with the common electrode, wherein the common electrode is disposed in a comb shape, the release electrodes are disposed insulatively to one another and arranged in an array to individually receive a time signal, the release electrodes are correspondingly disposed in gaps of the common electrode, and the common electrode and the release electrodes are electrified to constitute a horizontal electrical field.

12. The display device according to claim 11, wherein the release electrodes comprise strip electrodes arranged in an array along the horizontal display direction of the liquid crystal display panel, the common electrode comprises a comb electrode and a common line connected to the comb electrode, and the strip electrodes are embedded in a tooth electrode formed by the comb electrode and the common line.

13. The display device according to claim 12, wherein a driving voltage of the strip electrodes corresponding to the middle region and a driving voltage of the corresponding to the anti-peep regions are different, the comb electrode receives a constant voltage, and the comb electrode and adjacent one of the strip electrodes form a horizontal electrical field to drive the liquid crystals to rotate.

14. The display device according to claim 1, wherein a backlight module is further disposed on the light incident side of the liquid crystal display panel, and the backlight module comprises:
a light guide plate;
a light source located on a light incident side of the light guide plate;
a diffuser plate located on a light exiting side of the light guide plate;
a prism film located on a light exiting side of the diffuser plate; and,
the anti-peep film located on a light exiting side of the prism film.

15. The display device according to claim 1, wherein the anti-peep film is a microscopic shutter, and an interval of the microscopic shutter is 0.07 mm.

16. The display device according to claim 1, wherein the liquid crystal layer is one of vertically rotational type liquid crystals, twisted nematic type liquid crystals, or horizontally rotational type liquid crystals.

17. An anti-peep state switching film driving method for a display device, wherein an anti-peep state switching film comprises: a first substrate and a second substrate disposed oppositely, a liquid crystal layer located between the first substrate and the second substrate, and driver electrodes located on at least one side of the liquid crystal layer, the driver electrodes comprise a common electrode and release electrodes disposed opposite to the common electrode, the release electrodes are distributed insulatively, and an electrical field is generated between the electrified release electrodes and the common electrode to drive the liquid crystals to rotate;
wherein the driving method comprises:
when the display device is in a sharing display mode, applying a current of a constant voltage to the common electrode of the anti-peep state switching film; and
applying a voltage different from that on the common electrode to the release electrodes of the anti-peep state switching film to constitute an electrical field driving the liquid crystals to rotate, and voltages applied to adjacent ones of the release electrodes on the first substrate and the second substrate are different to diffuse rotational angles of the liquid crystals;
wherein the method further comprises:
in the release electrodes distributed on the first substrate or the second substrate, voltages applied to the release electrodes are gradually lowered along a direction from ones of the release electrodes relatively near a central display region to ones of the release electrodes relatively away from the central display region; and
a minimal voltage value applied to the release electrodes is greater than or equal to a voltage value applied to the common electrode.

18. The anti-peep state switching film driving method for a display device according to claim 17, wherein
when the display device is in an anti-peep display mode, no voltage is applied to the anti-peep state switching film, the liquid crystals of the anti-peep state switching film are at a pre-tilt rotational angle, and the liquid crystals in a region corresponding to each of the release electrodes are at the same rotational angle to reduce a light exiting range.

* * * * *